US010527155B2

(12) United States Patent
Perkins

(10) Patent No.: US 10,527,155 B2
(45) Date of Patent: Jan. 7, 2020

(54) APPARATUS AND METHOD FOR PROVIDING LUBRICATION RESERVOIR FOR AN ACTUATOR OR OTHER DEVICE

(71) Applicant: Inteva Products, LLC, Troy, MI (US)

(72) Inventor: Donald M. Perkins, Sterling Heights, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 15/179,987

(22) Filed: Jun. 11, 2016

(65) Prior Publication Data
US 2016/0363210 A1    Dec. 15, 2016

Related U.S. Application Data

(60) Provisional application No. 62/174,494, filed on Jun. 11, 2015.

(51) Int. Cl.
*F16H 57/04* (2010.01)
*F16H 1/16* (2006.01)

(52) U.S. Cl.
CPC ............ *F16H 57/0471* (2013.01); *F16H 1/16* (2013.01); *F16H 57/045* (2013.01)

(58) Field of Classification Search
CPC ....... F16H 57/0471; F16H 1/16; F16H 57/045
See application file for complete search history.

(56) References Cited

U.S. PATENT DOCUMENTS

| | | | | |
|---|---|---|---|---|
| 1,667,285 A | * | 4/1928 | Clisson | F16H 1/16 184/11.1 |
| 1,940,110 A | * | 12/1933 | Watts | F16H 57/0498 184/11.1 |
| 1,949,084 A | * | 2/1934 | Royle | B29C 47/0801 425/107 |
| 2,041,191 A | * | 5/1936 | Kunkle | F16N 7/366 184/13.1 |
| 2,551,980 A | * | 5/1951 | Tholl | B04B 9/10 184/6.12 |
| 2,563,562 A | * | 8/1951 | Stone | H02K 7/081 310/202 |
| 2,914,864 A | * | 12/1959 | Clem | D21F 7/02 34/121 |
| 2,916,201 A | * | 12/1959 | Hemfort | B04B 9/12 384/199 |
| 3,026,850 A | * | 3/1962 | Clifton | B30B 15/28 254/103 |
| 3,112,012 A | * | 11/1963 | Hoch | F01M 11/045 123/196 R |
| 3,396,611 A | * | 8/1968 | Smith | F16H 57/0434 184/6 |
| 3,498,159 A | * | 3/1970 | Wilmeth | B25B 21/002 81/57 |
| 3,969,789 A | | 7/1976 | Wize | |

(Continued)

*Primary Examiner* — Zakaria Elahmadi
(74) *Attorney, Agent, or Firm* — Cantor Colburn LLP

(57) ABSTRACT

A worm drive system is provided. The worm drive system having: a motor for rotating a worm, the worm having a bearing surface rotatably received by a bearing surface integral with a housing the worm is located in, wherein a lubrication reservoir is located proximate to the bearing surface of the worm such that lubricants located in the reservoir are dispersed onto the bearing surface of the worm.

13 Claims, 5 Drawing Sheets

(56) References Cited

U.S. PATENT DOCUMENTS

| | | | |
|---|---|---|---|
| 5,186,068 A * | 2/1993 | Heller | F16H 1/16 |
| | | | 384/519 |
| 6,568,741 B1 | 5/2003 | Leung et al. | |
| 6,679,531 B2 | 1/2004 | Rogers, Jr. et al. | |
| 8,328,249 B2 * | 12/2012 | Corrales | E05B 81/14 |
| | | | 292/201 |
| 8,348,310 B2 | 1/2013 | Vazquez et al. | |
| 8,894,106 B2 | 11/2014 | Vazquez et al. | |
| 8,967,679 B2 | 3/2015 | Estrada et al. | |
| 2005/0173183 A1 * | 8/2005 | Chikaraishi | B62D 5/0409 |
| | | | 180/444 |
| 2006/0273672 A1 * | 12/2006 | Inoue | H02K 7/003 |
| | | | 310/83 |
| 2010/0127512 A1 | 5/2010 | Vazquez et al. | |
| 2014/0292000 A1 | 10/2014 | Vazquez et al. | |

* cited by examiner

APPARATUS AND METHOD FOR PROVIDING LUBRICATION RESERVOIR FOR AN ACTUATOR OR OTHER DEVICE

CROSS REFERENCE TO RELATED APPLICATIONS

This application claims the benefit of U.S. Provisional Patent Application Ser. No. 62/174,494, filed on Jun. 11, 2015, the entire contents of which are incorporated herein by reference thereto.

BACKGROUND

Various embodiments of the present invention relate to a reservoir for an actuator and in one embodiment, a reservoir for an actuator of a vehicle latch. Still further, various embodiments of the present invention relate to a reservoir for a rotating component.

Electromechanical actuators commonly found in automotive door latches employ lubricants to increase the efficiency of gearing systems and maintain longevity. However and as the gear system rotates, much of this deposited lubricant is flung off the surfaces intended to have the lubricant deposited on. In addition, the lubricant that remains on these surfaces can become contaminated with dust, salt and many other types of debris commonly found in the environment surrounding the door latch.

If the intended grease quantity could remain in contact with the gearing surfaces, the system could maintain optimal efficiency, or run with higher efficiency than a system which allows the grease to move off the intended surfaces.

Accordingly, it is desirable to provide an apparatus and/or component and/or method for keeping a desired amount of lubricant of the gearing surfaces of the system.

SUMMARY OF THE INVENTION

In one embodiment, a worm drive system is provided. The worm drive system having: a motor for rotating a worm, the worm having a bearing surface rotatably received by a bearing surface integral with a housing the worm is located in, wherein a lubrication reservoir is located proximate to the bearing surface of the worm such that lubricants located in the reservoir are dispersed onto the bearing surface of the worm.

In another embodiment, a vehicle latch is provided, the vehicle latch having: an actuator with a worm drive system, the worm drive system having: a motor for rotating a worm, the worm having a bearing surface rotatably received by a bearing surface integral with a housing the worm is located in, wherein a lubrication reservoir is located proximate to the bearing surface of the worm such that lubricants located in the reservoir are dispersed onto the bearing surface of the worm.

In yet another embodiment, a method of lubricating a worm drive system is provided. The method including the steps of: rotatably mounting a bearing surface of a worm in a housing wherein the bearing surface rotatably engages a bearing surface integral with the housing; and lubricating the bearing surface of the worm via a reservoir located proximate to the bearing surface of the worm.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

While the concept disclosed herein is referenced with a specific area of a worm-worm gear system, specifically the worm bearing. It is understood that this concept could also be adapted to any area of any gear system to retain the intended lubricant in the area of most importance, and maintain a reservoir of lubricant or lubricating media to constantly transfer it to the intended surfaces. As used herein lubricant or lubricating media may refer to any substance, such as oil, oils, grease or equivalents thereof or any other material, used for minimizing friction between at least two components.

Figure 1:
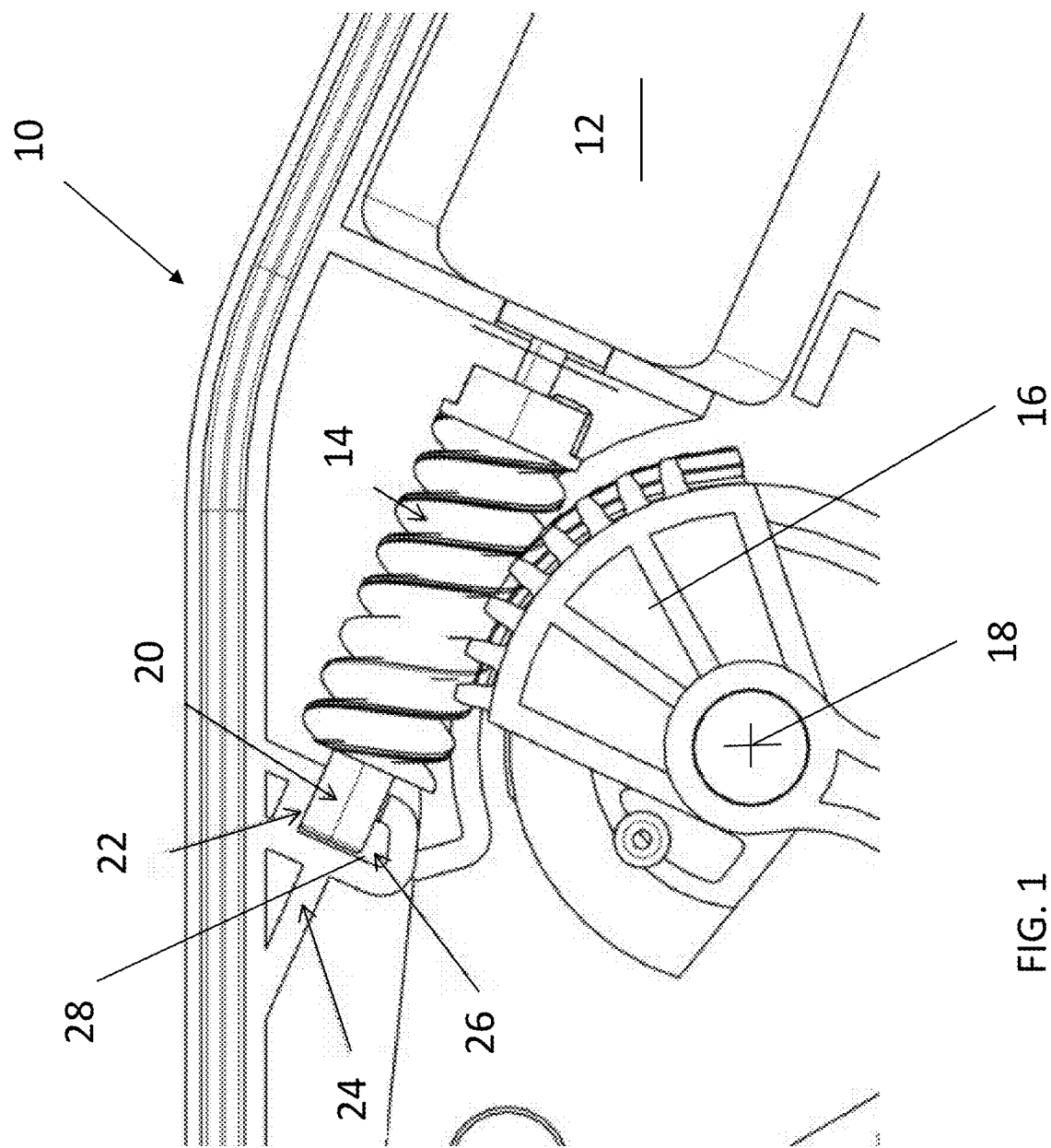
FIG. 1 is a view of a portion of a worm drive system with a lubricant reservoir in accordance with one non-limiting embodiment of the present invention.

Referring now to the FIGS., and in particular FIG. 1, a worm drive system 10 used in a latch product is illustrated. The worm drive system 10 has a motor (DC or otherwise) 12 that rotates a worm 14 which in turn rotates a worm gear 16 about its pivot or pivot axis 18 to change the state of an actuator the worm drive system 10 is associated with. As such, the movement of the worm 14 may bias the worm gear 16 into an engaged or disengaged position. For example, worm gear 16 may also be operatively coupled to another movable component or multiple movable components of the latch and/or actuator such that movement of the worm gear 16 about its pivot 18 will cause a corresponding movement of a component or component(s) operatively connected to the worm gear 16 so that the state of the actuator and/or latch is changed.

The worm 14 is dual supported at the opposite end of the motor 12 by a bearing surface 20 integral with the worm 14, and is rotatably received by a bearing surface 22 integral with a retaining housing 24. As such, the worm 14 is secured to a shaft of the motor 12 and has integral bearing surface 20 rotatably received in the housing 24 and wherein bearing surface 20 of the worm 14 rotatably engages bearing surface 22 of the housing 24.

Also illustrated in FIG. 1 is that a lubrication reservoir 26 is formed in housing 24. The lubrication reservoir 26 is configured to receive a lubricant or lubricating media 28 and transfer it to the worm bearing or bearing surface 20. It being understood that lubrication reservoir 26 is proximate to bearing surface 20 when it is rotatably received by the housing 24 and the lubrication reservoir 26 is in fluid communication with the worm bearing or bearing surface 20. In addition, lubrication reservoir 26 is configured to hold a reserve or reservoir of lubricating media or lubricant 28 such that it can be dispersed onto worm bearing or bearing surface 20 during the operational life of the worm bearing or bearing surface 20.

Figure 2:
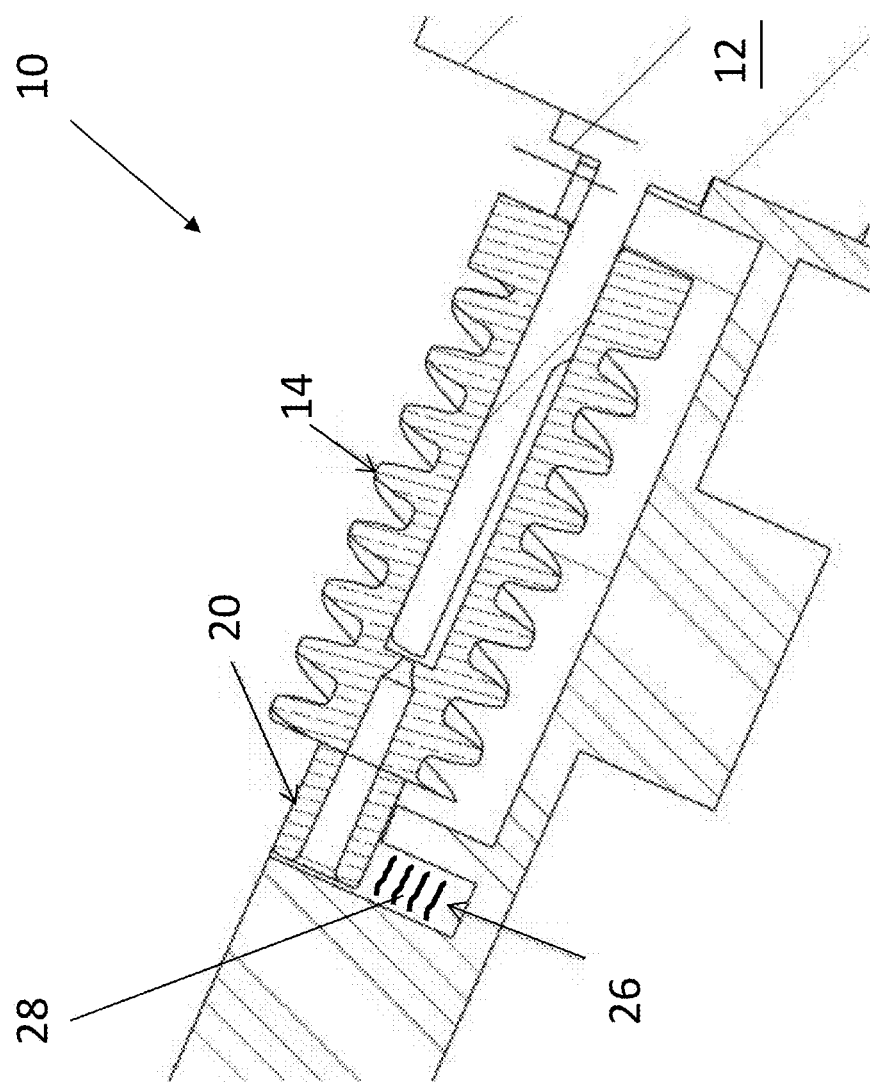
FIG. 2 is a cross-sectional view of the worm along an axis of the motor of the worm drive system.

FIG. 2 shows a section cut through the axis of the motor 12 and worm 14 and the lubrication reservoir area 26 found under the bearing surface 20 of the worm 14. Lubricant trapped in the reservoir will continue to lubricate the worm bearing 20 for a far greater time period than a worm bearing only lubricated on its surface and not being continuously lubricated from a reservoir. This continuous lubrication will provide increased efficiency and reduce wear on the bearing surface 20.

Figure 3:
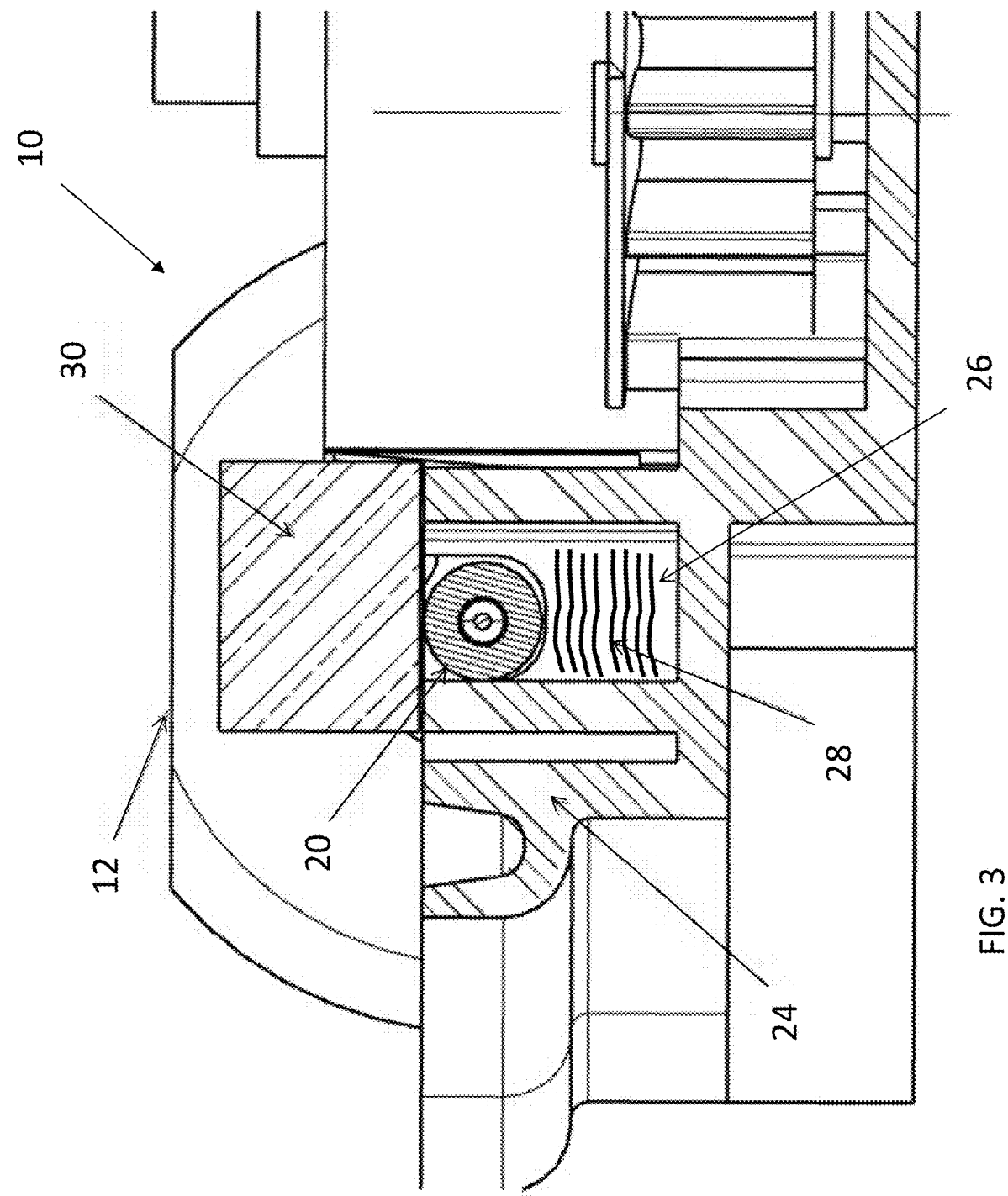
FIG. 3 is a cross-sectional view of the worm perpendicular to the axis of the worm drive system.

Referring now to FIG. 3, a section cut perpendicular to the axis of the motor 12 is illustrated. This view further illustrates the lubrication reservoir 26 and its capacity. In addition, FIG. 3 also depicts the adjoining surface from an assembly cover 30 that would mate with the retaining housing 24 and serve to hold down the worm bearing 20 and provide a cover for the lubrication reservoir 26 thus, further trapping the lubrication media 28 into the intended area.

Reference is made to the following U.S. Pat. Nos. 3,969,789; 6,568,741; 6,679,531; 8,328,249; 8,348,310; 8,894,106; and 8,967,679 and U.S. Patent Publication No. US 2010/0127512; and US 2014/0292000, the entire contents each of which are incorporated herein by reference thereto.

Figure 4:
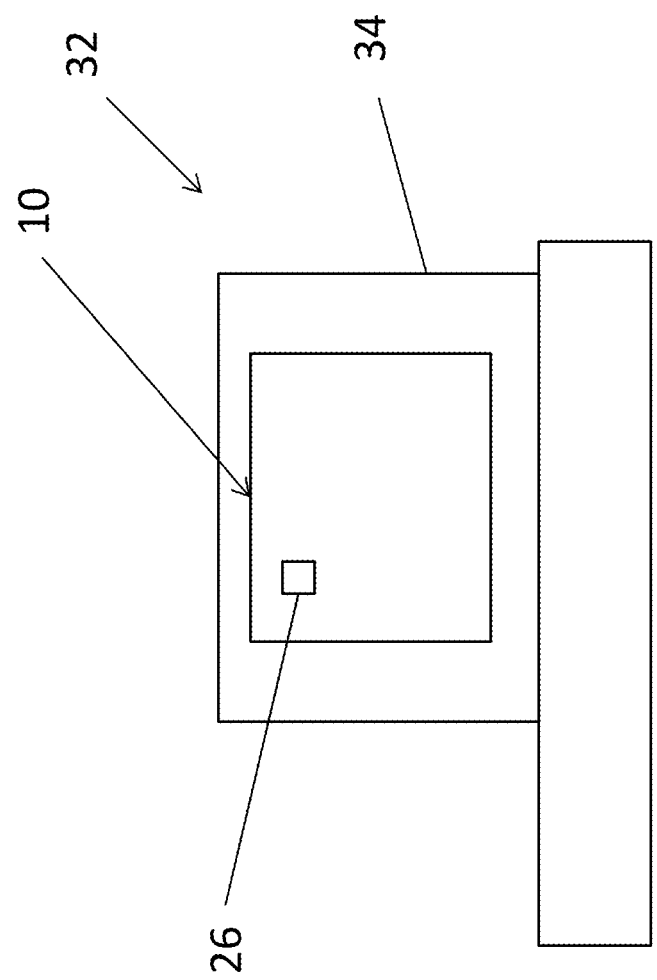
FIG. 4 is a non-limiting schematic illustration of a vehicle latch.

FIG. 4 is a non-limiting schematic illustration of a vehicle latch 32 with an actuator 34 and worm drive system 10 with a lubricating reservoir 26 located therein according to one non-limiting embodiment of the present invention.

Figure 5:
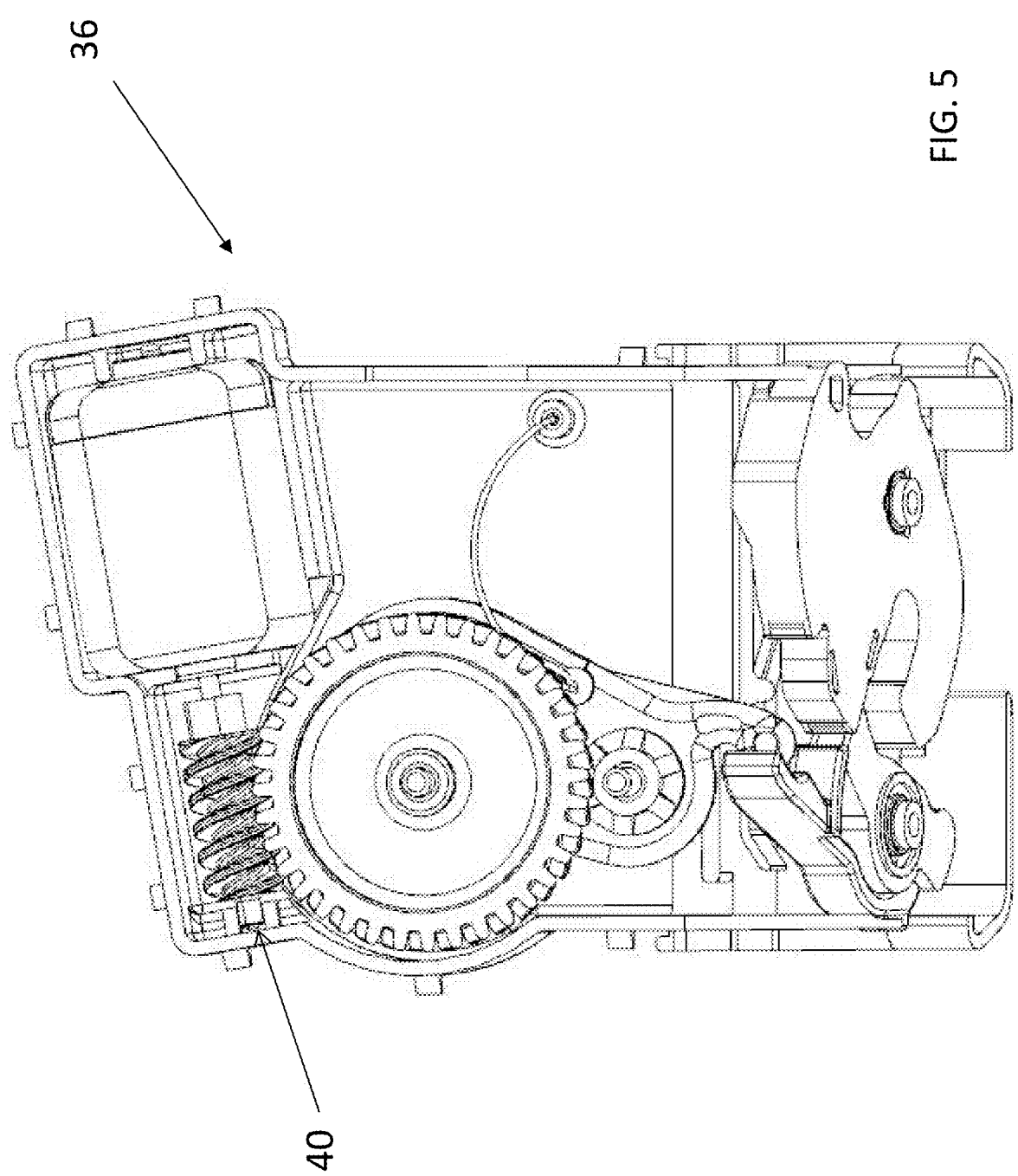
FIG. 5 is another non-limiting example of a vehicle latch.

FIG. 5 is another non-limiting illustration of a vehicle latch 36 that may be configured at location 40 to have the lubrication reservoir in accordance with various embodiments of the present invention.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A worm drive system, comprising:
    a motor for rotating a worm, the worm having a bearing surface integrally formed at a distal end of the worm, wherein the bearing surface of the worm is rotatably received by a bearing surface integrally formed with a housing of the worm drive system, the housing also surrounding the worm, wherein a lubrication reservoir is located proximate to the bearing of the housing such that a lubrication media located in the reservoir is dispersed onto the bearing surface of the worm as it rotates within the housing; and
    a cover secured to the housing, wherein the cover when secured to the housing secures the worm bearing surface in the housing by retaining the worm bearing surface against the bearing surface integrally formed with the housing that houses the worm, and wherein the cover when secured to the housing traps the lubrication media in the reservoir, wherein the worm drive system is located in an actuator of a vehicle latch.

2. The worm drive system as in claim 1, wherein the worm is operatively coupled to a worm gear pivotally mounted to the housing.

3. The worm drive system as in claim 1, wherein the motor is a DC motor.

4. The worm drive system as in claim 1, wherein the worm is operatively coupled to a worm gear pivotally mounted to the housing, wherein rotation of the worm changes the state of an actuator the worm drive system is associated with.

5. The worm drive system as in claim 1, wherein the worm is operatively coupled to a worm gear pivotally mounted to the housing, wherein rotation of the worm biases the worm gear into an engaged or disengaged position.

6. The worm drive system as in claim 1, wherein the lubrication reservoir is located below the bearing surface of the worm and wherein the lubrication media trapped in the lubricant reservoir will lubricate the worm bearing surface.

7. A vehicle latch, comprising:
    an actuator with a worm drive system, the worm drive system comprising:
    a motor for rotating a worm, the worm having a bearing surface integrally formed at a distal end of the worm, wherein the bearing surface of the worm is rotatably received by a bearing surface integrally formed with a housing of the vehicle latch, the housing also surrounding the worm, wherein a lubrication reservoir is located proximate to the bearing of the housing such that a lubrication media located in the reservoir are dispersed onto the bearing surface of the worm as it rotates within the housing; and
    a cover secured to the housing, wherein the cover when secured to the housing secures the worm bearing surface in the housing by retaining the worm bearing surface against the bearing surface integrally formed with the housing that houses the worm, and wherein the cover when secured to the housing traps the lubrication media in the reservoir.

8. The vehicle latch as in claim 7, wherein the worm is operatively coupled to a worm gear pivotally mounted to the housing.

9. The vehicle latch as in claim 7, wherein the worm is operatively coupled to a worm gear pivotally mounted to the housing, wherein rotation of the worm changes the state of the actuator.

10. The vehicle latch as in claim 7, wherein the lubrication reservoir is located below the bearing surface of the worm and wherein the lubrication media trapped in the lubricant reservoir will lubricate the worm bearing surface.

11. A method of lubricating a worm drive system, comprising:
    rotatably mounting an integral bearing surface located at a distal end of a worm in a housing of the worm drive system, wherein the integral bearing surface of the worm rotatably engages a bearing surface integrally formed with the housing of the worm drive system, the housing also surrounding the worm; and lubricating the integral bearing surface of the worm with a lubrication media stored in a reservoir located proximate to the bearing surface of the housing of the worm drive system;

trapping the lubrication media in the reservoir with a cover secured to the housing of the worm drive system, wherein the cover secures the integral bearing surface of the worm to the integral bearing surface of the housing of the worm drive system by retaining the integral bearing surface of the worm against the bearing surface integrally formed with the housing that houses the worm, wherein the worm drive system is located in an actuator of a vehicle latch.

12. The method as in claim 11, wherein the worm is operatively coupled to a worm gear pivotally mounted to the housing.

13. The method as in claim 11, wherein the worm is operatively coupled to a worm gear pivotally mounted to the housing, wherein rotation of the worm changes the state of an actuator the worm drive system is associated with.

\* \* \* \* \*